(12) United States Patent
Maurer

(10) Patent No.: US 10,117,063 B1
(45) Date of Patent: Oct. 30, 2018

(54) REAL-TIME LOCATING SYSTEM WITH LIMITED OR NO INFRASTRUCTURE AND METHOD OF USE

(71) Applicant: Michael Maurer, Woolwich Township, NJ (US)

(72) Inventor: Michael Maurer, Woolwich Township, NJ (US)

( * ) Notice: Subject to any disclaimer, the term of this patent is extended or adjusted under 35 U.S.C. 154(b) by 0 days.

(21) Appl. No.: 15/874,473

(22) Filed: Jan. 18, 2018

(51) Int. Cl.
*H04W 4/029* (2018.01)
*H04W 4/33* (2018.01)
*G06K 9/00* (2006.01)
*H04N 5/232* (2006.01)
*H04W 4/80* (2018.01)
*H04W 4/35* (2018.01)

(52) U.S. Cl.
CPC ........ *H04W 4/029* (2018.02); *G06K 9/00288* (2013.01); *H04N 5/23293* (2013.01); *H04W 4/33* (2018.02); *H04W 4/80* (2018.02); *H04W 4/35* (2018.02)

(58) Field of Classification Search
CPC ............................... A62B 33/00; G01C 15/00
USPC ....................................................... 340/686.6
See application file for complete search history.

(56) References Cited

U.S. PATENT DOCUMENTS

| 2007/0205886 A1* | 9/2007 | Huseth | A62B 9/006 340/539.15 |
| 2012/0169530 A1* | 7/2012 | Padmanabhan | G01C 15/00 342/146 |
| 2016/0171777 A1* | 6/2016 | Todeschini | G06T 19/006 345/633 |

* cited by examiner

*Primary Examiner* — Fabricio R Murillo Garcia
(74) *Attorney, Agent, or Firm* — Eldredge Law Firm, LLC; Richard Eldredge; Beth Felix

(57) ABSTRACT

A locating system includes a central server to receive and process data; a device to be secured or assigned to a person or asset, the device having one or more sensors configured to detect a distance from a plurality of physical structures, the distance being transmitted as raw data to the central server; a software installed on the server and providing a computer implemented drawing of a building or site, the computer implemented drawing having a database of floorplans associated with the building; and a unique identifier incorporated into one of the physical structures, the unique identifier to be sensed by the device and provide the device with a building information; the raw data is correlated to the database of floorplans to determine a first location associated with the device. Real time tracking is achieved via constantly collecting raw data to be compared to the database of floorplans and site plans.

15 Claims, 6 Drawing Sheets

REAL-TIME LOCATING SYSTEM WITH LIMITED OR NO INFRASTRUCTURE AND METHOD OF USE

BACKGROUND

1. Field of the Invention

The present invention relates generally to location tracking systems, and more specifically, to a real-time location tracking system utilizing limited to no infrastructure, thereby providing for an effective and economical tracking system.

2. Description of Related Art

Location tracking systems are well known in the art and are an effective means to determine a location of a person or asset. For example, FIG. 1 depicts a conventional location tracking system 101 having a plurality of people 103a-c and a plurality of tracking tags 105a-c associated therewith. During use, one or more readers 107a-b receive signals from the plurality of tracking tags 105a-c to provide a network 109 having one or more of a server 111, database 113, and computing device 115 with a location of the people and/or assets within a geographical area that contains a tracking infrastructure.

One of the problems commonly associated with system 101 is expense due to the large amount of infrastructure, including various types of readers. For example, many organizations find it cost prohibitive to install the multitude of readers required by system 101 above. Further, these organizations find that the cost outweighs the benefit when they desire to only track minimal equipment or life safety is not considered when tracking persons.

Accordingly, although great strides have been made in the area of tracking systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
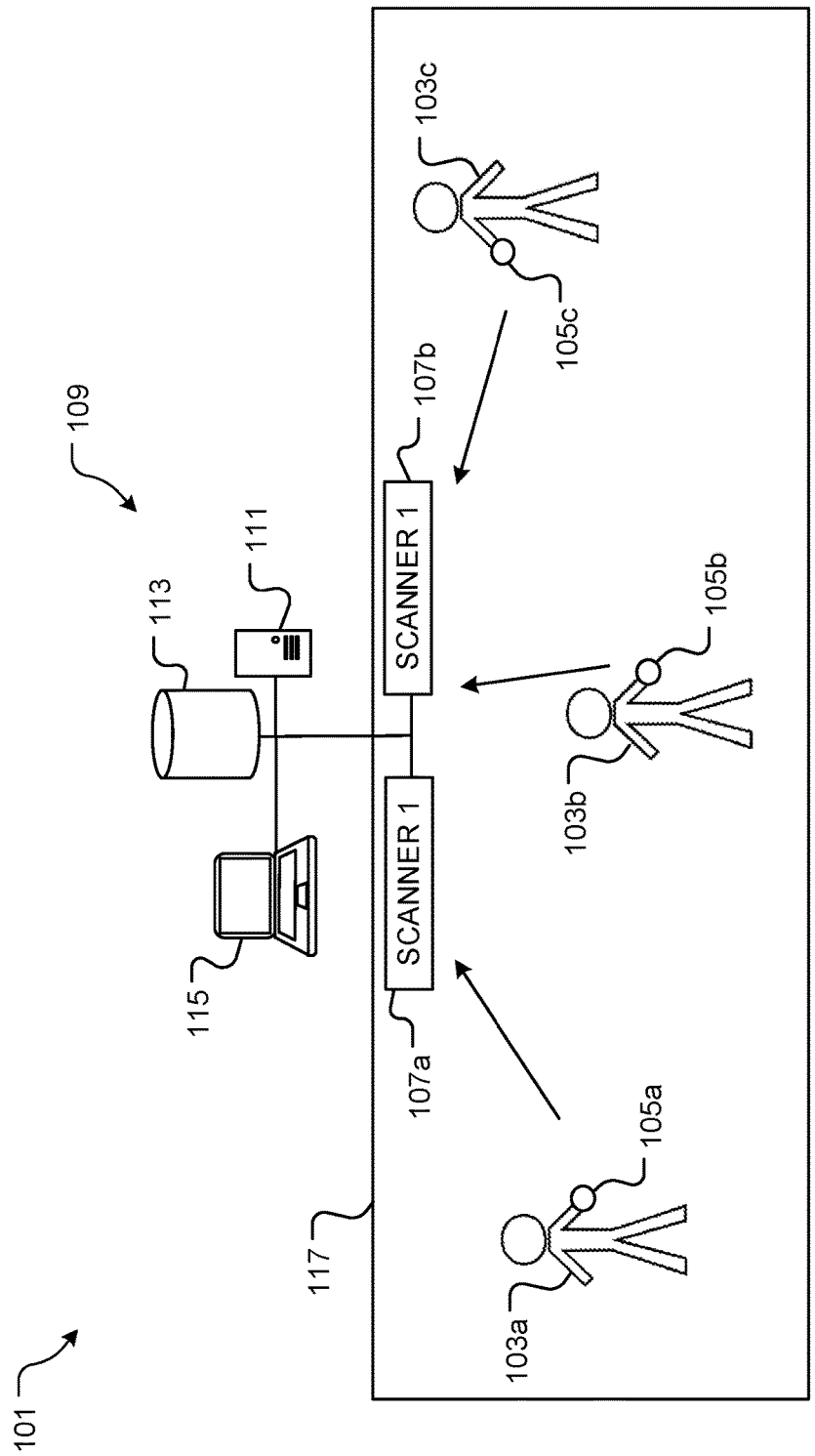
FIG. 1 is a simplified schematic of a common person and apparatus tracking system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tracking systems. Specifically, the present invention provides a cost-effective tracking system by eliminating most or all of the infrastructure associated with conventional tracking systems. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
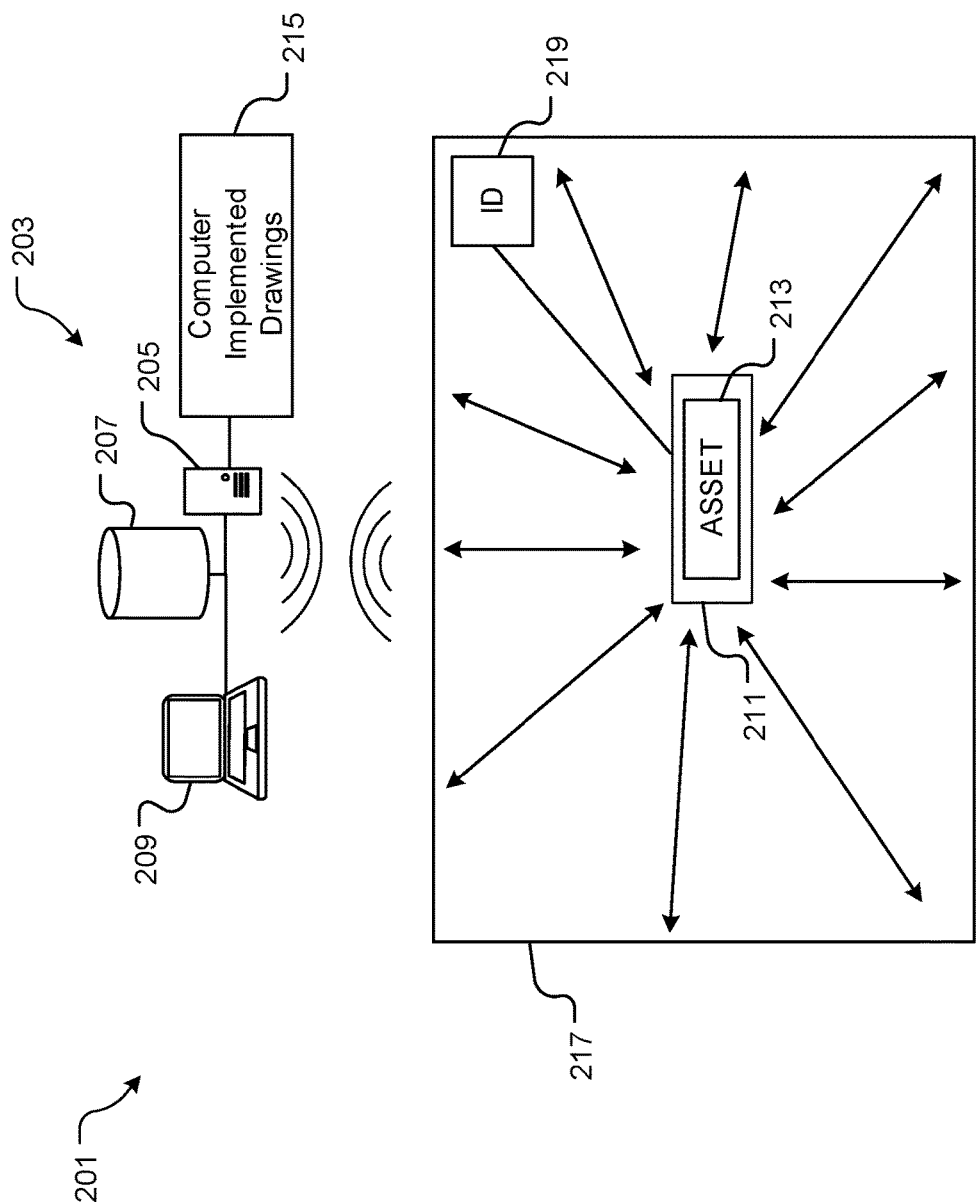
FIG. 2 is a simplified schematic of a real-time tracking system in accordance with a preferred embodiment of the present application.

Referring now to the drawings wherein like reference characters identify corresponding or similar elements throughout the several views, FIG. 2 depicts a simplified schematic of a real-time location tracking system 201 in accordance with a preferred embodiment of the present application. It will be appreciated that system 201 overcomes one or more of the above-listed problems commonly associated with conventional location tracking systems.

In the contemplated embodiment, system 201 includes a network 203 having one or more of a server 205, a computer 207 and a database 209 wherein the network is configured to receive and process data received from one or more tracking devices 211, the one or more tracking devices being associated with and connected to persons or assets 213. It should be appreciated that the various components of the network can vary to perform the same function described herein, specifically, the server can be a cloud based server configured to wirelessly process and transmit data. Further, it must be understood that technological advances can further be incorporated into system 201 to achieve the same function.

It should be understood that the system and method discussed herein as a simplified version, can be expanded to a large number of tracking devices, associated with a large number of persons or assets, and further used on large campuses or within large buildings.

In some embodiments, tracking devices 211 are tags having one or more sensors configured to emit signals and be secured to assets, such as electrical equipment, medical equipment and the like. In alternative embodiments, the tracking devices can be incorporated into mobile computing devices, such as smart phone, wherein the mobile computing devices include sensors configured to emit signals. It should again be understood that system 201 contemplates the use of any tracking devices that are developed in the future, having the same functionality and practicality as discussed herein. It should further be appreciated that the tracking devices 211, can include any known technology to aid in tracking, including GPS technology and cellular communication technology.

It should be appreciated that each tracking device has a unique ID, thereby providing a means to assign each tracking device to a specific person or asset. Further, the unique ID can include pertinent information, such as equipment type, equipment serial number, patient name, medical history, staff name, etc.

In the present invention, a software program 215 is incorporated into network 203 and includes a method to create and/or download computer implemented drawings of one or more buildings, the computer implemented drawings containing detailed data regarding floorplans, structures, and the like of buildings associated with campuses.

Tracking device 211 is configured to emit one or more signals, such as radio frequency signals, ultrasound signals, and/or infrared signals, whereby said signals are configured to detect structures 217 such as wall surfaces, thereby providing raw distance data between the tracking device and surroundings. In FIG. 2, 217 represents a simplified example of a room associated with a building in which tracking is implemented. Further in FIG. 2, the plurality of arrows emanating from tracking device 211 demonstrate the raw distance data as determined in the room.

System 201 further includes one or more unique identifiers 219 associated with entry points of buildings and floors. This feature will be discussed in more detail according to FIG. 3. Unique identifiers 219 provide additional data to be picked up by tracking device 211, this additional data providing information such as floor number and designated building.

During use of system 201, the unique identifier is picked up by tracking device 211 as a start for the tracking of the device's location. Next, the raw distance data is determined, and all data is transmitted to the server to be compared to the floorplan data of the computer implemented drawings. In this manner, the software and server determine a precise location of the tracking device.

Figure 3:
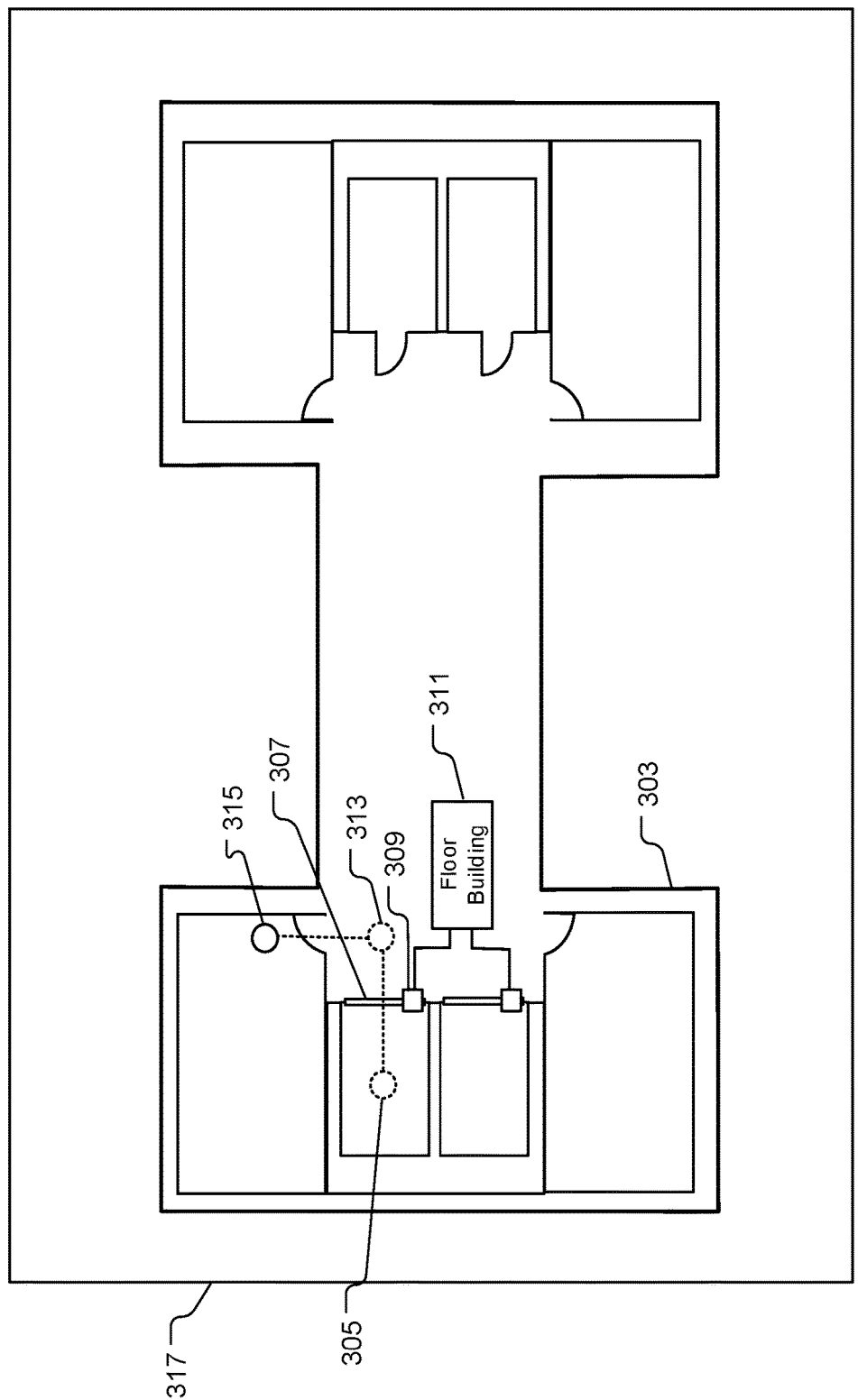
FIG. 3 is a diagram of a building from FIG. 2.

In FIG. 3, a simplified diagram 301 depicts a layout of a building 303 and interaction of the various components. As a tracking device 305 enters a floor, such as through an elevator opening 307, a first unique identifier 309 is read by the tracking device, thereby providing a determination of floor and/or building 311. The tracking device immediately and continuously collects raw distance data to be transmitted to the network/server, thereby allowing for the correlation of the distance data to the floorplan data and providing a first location 313 of the tracking device. As the asset or person moves, and therefore the tracking device moves, distance data is again tracked, and referenced back to the first location, to update to a second location 315. It should be appreciated that this information can be further presented on a display 317 associated with a computing device, wherein a user can visually monitor the location of a person or asset.

Figure 4:
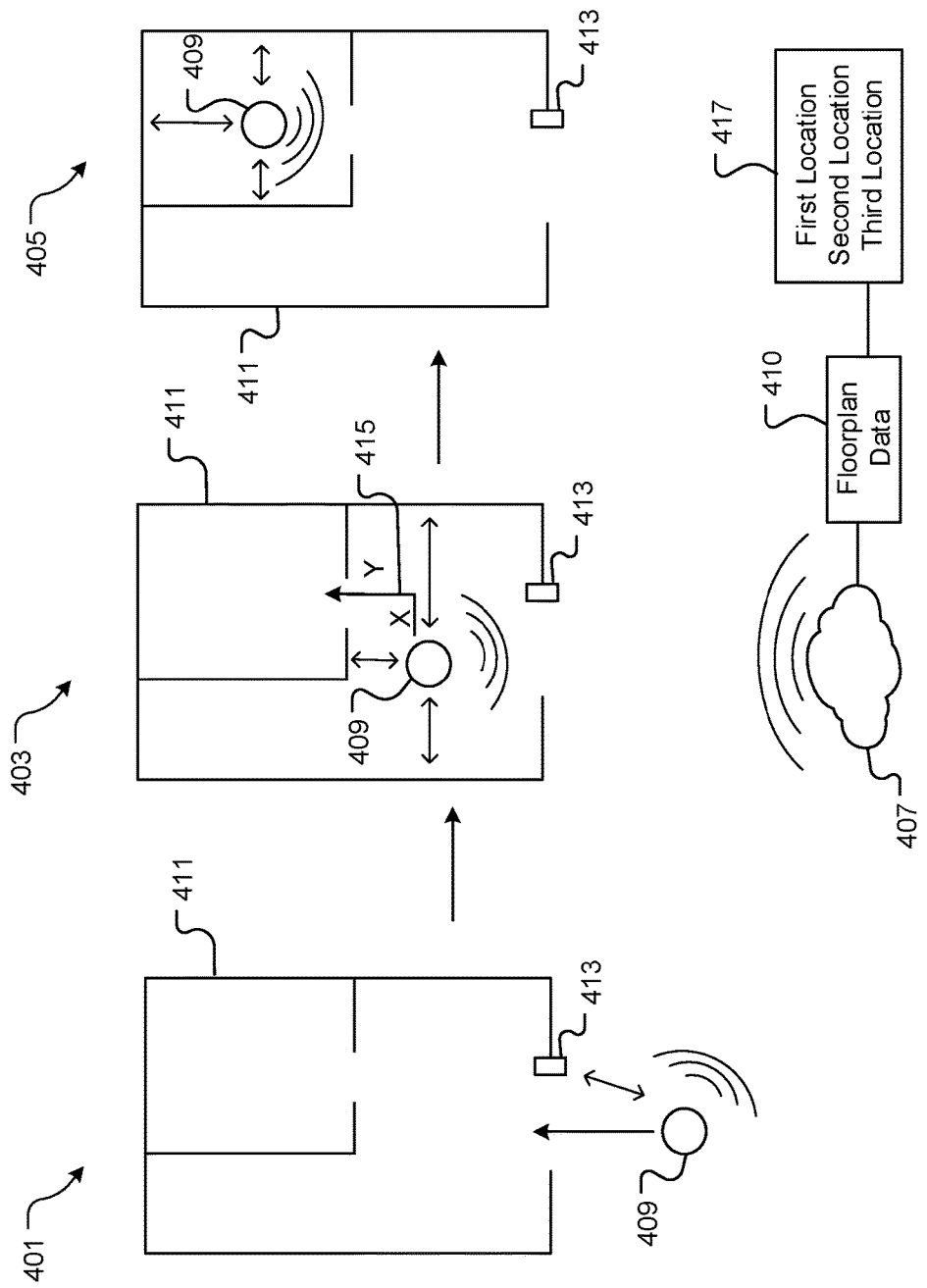
FIG. 4 is a simplified schematic of a plurality of steps associated with the system of FIG. 2.

In FIG. 4, a simplified schematic of a series of steps 401, 403, 405 associated with the method above is further depicted for clarity. In this figure, a cloud based server 407 is shown, being interchangeable with the network and features previously discussed. As shown in step 401, as a tracking device 409 enters a floor/building 411, a unique identifier 413 is read. It should be understood that the unique identifier could communicate via Bluetooth technology, wifi technology, or any other known or future technology with tracking device 409. Raw distance data is picked up via tracking device 409 and transmitted to server 407, the raw distance data being based on distances between the tracking device 409 and structures within a room. The one or more sensors are specifically adapted to read the precise distances to walls and structures. It should be appreciated that the system is specifically adapted to discern between existing or moving objects in a room/area based on intelligent object recognition. This technology further allows for the system to determine if there is a change occurring to a floorplan.

A first location is determined by correlating the raw distance data to floorplan data 410, as shown in step 403, wherein the first location is then used as a reference point for all future moves. As the tracking device 409 is moved to a new location, as shown in step 405, the new raw distance data (as depicted with arrows) is used to determine the X and Y [or latitude/longitude, as some drawings are created geospatially] traveled distance 415 of the tracking device relative to the first location, thereby allowing for an update within the server 407 from a first location to a second location, and so forth 417.

It should be appreciated that one of the unique features believed characteristic of the present application is the limited infrastructure necessary to track a plurality of persons or assets. This feature is achieved by collecting raw distance data from one or more sensors incorporated into a tracking device and correlating said raw data to floorplan data associated with a computer hosted intelligent drawing.

Figure 5:
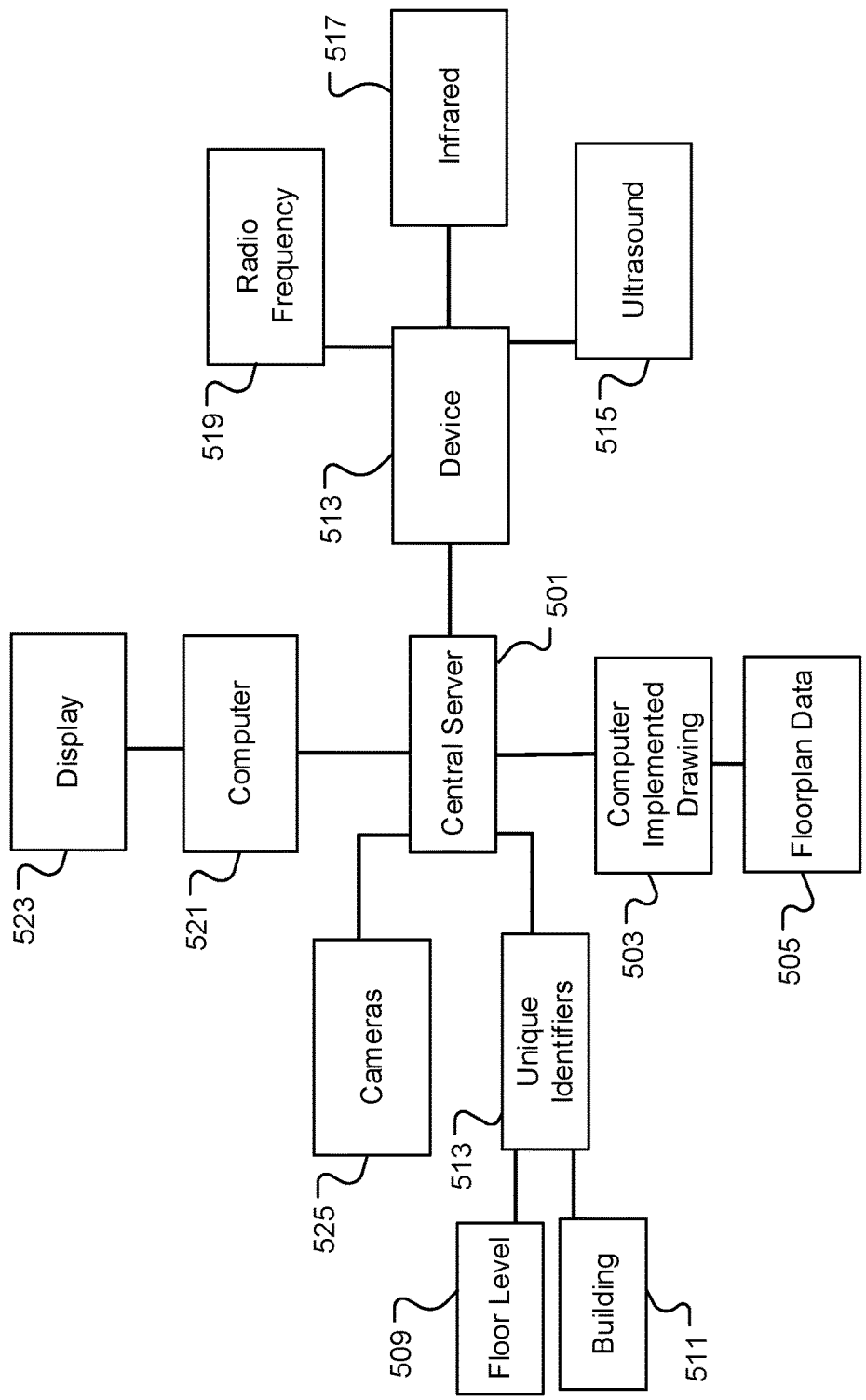
FIG. 5 is a simplified schematic of the features of the system of FIG. 2.

In FIG. 5, a simplified schematic demonstrates the features already discussed herein and additional features contemplated to be incorporated into the present invention. First, a central server 501 is the primary component configured to receive and process data from one or more sources. A computer implemented drawing software 503 is incorporated to provide floorplan data 505 associated with one or more buildings. One or more unique identifiers 507 are installed at portals within the building, specifically at entry points or wherever needed on each floor, thereby providing information including a floor level 509 and building designation 511.

One or more tracking devices 513 having one or more sensors, such as ultrasound sensors 515, infrared sensors 517, radio frequency sensors 519, and any other appropriate sensor, are used to communicate with the unique identifiers and pick up raw distance data from structures within the building and communicate the information to the central server 501.

In some embodiments, one or more computing devices 521 are in communication with the central server 501 to provide a means to receive location data by one or more users and present location data on a display 523. It should be appreciated that the one or more computing devices 521 can be computer, tablets, mobile phones, smart technology devices, and the like as well as any future technology.

In some embodiments, the system of the present invention can further include one or more cameras 525, such as security cameras installed at designated locations within the building. In these embodiments, the one or more cameras can be used to stream video or still images to the sever. The cameras can be further programmed to automatically stream and discontinue streaming based on commands received, the commands signaling the presence of one of the tracking devices within the view of a specified camera. Further, it should be appreciated that one or more cameras could be used for intelligent object and/or facial recognition.

Figure 6:
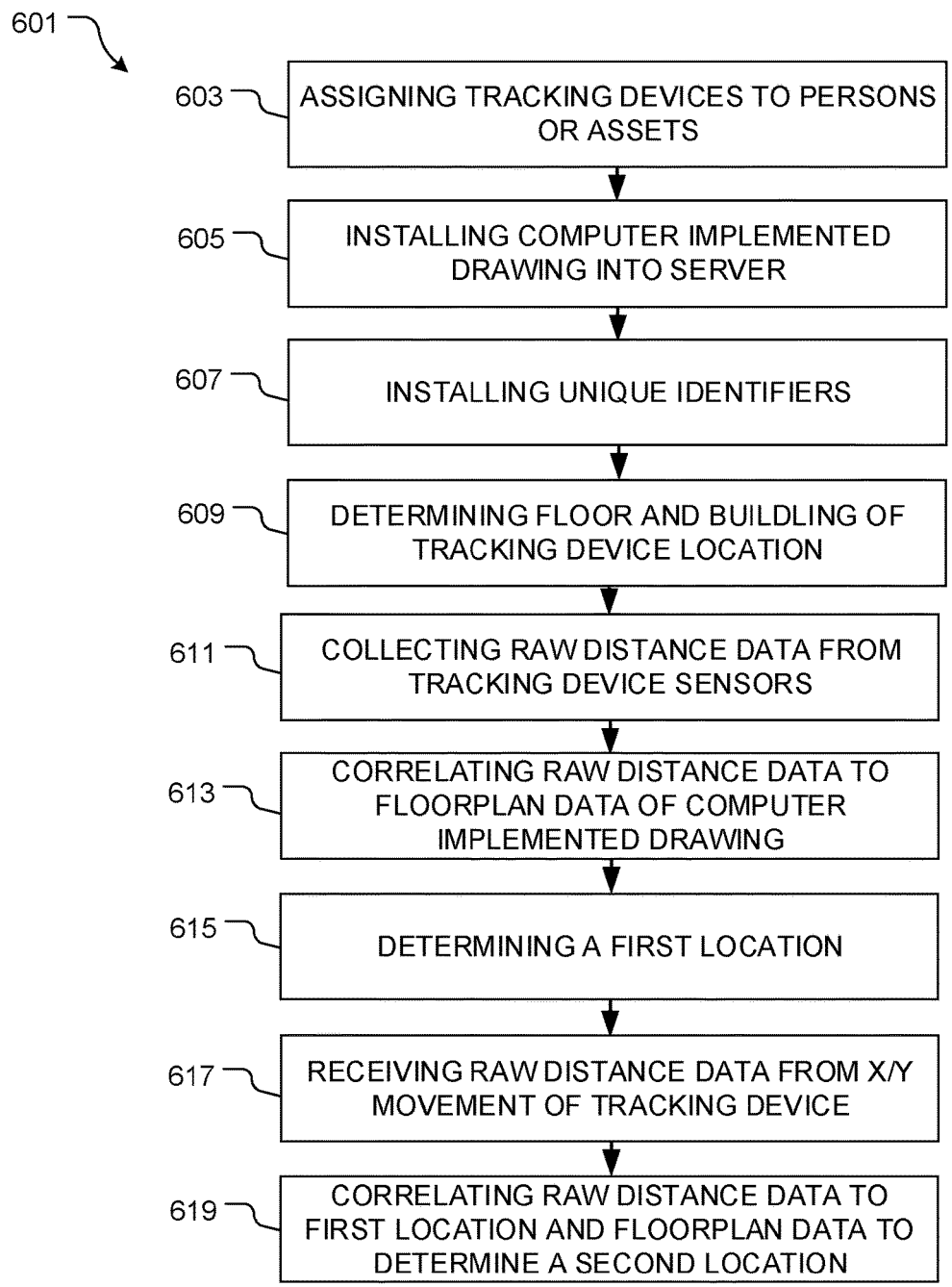
FIG. 6 is a flowchart of the method of use of the system of FIG. 2.

In FIG. 6, a flowchart 601 further depicts the method of use of system 201 discussed above. During use, the plurality of tracking devices are assigned through conventionally known methods to persons or assets, as shown with box 603 (for clarity, a person and/or asset has a unique ID associated with a tracking device that also has a unique ID). The computer implemented drawing software is installed, thereby providing floorplan and site plan data of one or more buildings or an entire campus for outdoor tracking, as shown with box 605. Unique identifiers are installed at entry points of floors and buildings, thereby providing a means to initially determine a floor and/or building where a tracking device is located, as shown with boxes 607, 609. As a tracking device moves, raw distance data is collected via the one or more sensors and transmitted to the central server, wherein the raw distance data is correlated to floorplan data to determine a precise first location of the tracking devices, as shown with boxes 611, 613, 615. As the tracking device continues to move, raw distance data is collected and correlated back to the first location to determine the horizontal and vertical movement of the tracking device, thereby further determining a second location, as shown with boxes 617, 619.

It should be appreciated that the system of the present invention can be programmed to update location determination at predetermined intervals, thereby ensuring that data does not backlog processing of the system. Further, it should be appreciated that during renovations and construction, such information can update intelligent drawings within the server, thereby ensuring the 'living' drawing repository is always current to continuity for accurate tracking.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A locating system, comprising:
a central server configured to receive and process data;
a device with a unique first identifier configured to be secured or assigned to a person or asset, the device having one or more sensors configured to immediately and continuously detect a first distance from a plurality of physical structures within a campus, the first distance being wirelessly transmitted as raw data to the central server; wherein the plurality of physical structures and subsequent plurality of structures are selectively recognized between static and moving objects based on intelligent object recognition;
a software installed on the central server and providing a computer implemented drawing of the campus, the computer implemented drawing having a database of floorplans and site plans associated with the campus; and
a unique second identifier incorporated into one of the plurality of physical structures, the unique second identifier configured to be wirelessly sensed by the device and provide the device with a campus information;
wherein the raw data is correlated to the database of floorplans, site plans, first identifier, and campus information, to determine a first location of the device within the campus;
wherein the central server is further configured to i) receive additional raw data from the device, the additional raw data related to subsequent plurality of distances from the subsequent plurality of structures in relation to the first distance within the campus; and ii) correlate the additional raw data to the first location to determine subsequent locations of the device.

2. The system of claim 1, wherein the campus information includes a building designation and a floor designation.

3. The system of claim 1, wherein the device is a computing device.

4. The system of claim 1, wherein the device is a tag.

5. The system of claim 1, further comprising:
one or more cameras configured to communicate with the central server;
wherein the one or more cameras are configured to stream images to the central server and incorporate intelligent object and facial recognition.

6. The system of claim 1, further comprising:
a central computing device having a display configured to provide a visual representation of the first location and one or more subsequent locations of the device.

7. The system of claim 1, wherein the one or more sensors comprises one or more of:
an infrared sensor;
a radio frequency sensor;
an ultrasound sensor; and
a low frequency 125 Khz RF exciter.

8. The system of claim 1, wherein the unique second identifier is incorporated into an electronic device and is configured to be transmitted to the central server.

9. The system of claim 8, wherein the unique second identifier is transmitted wirelessly via Bluetooth technology.

10. A method of tracking persons and/or assets, the method comprising:
assigning a device with a unique first identifier to a person or asset to be tracked, the device having one or more sensors configured to immediately and continuously detect a first distance from a plurality of physical structures within a campus, the first distance being wirelessly transmitted as raw data to a central server, wherein the plurality of physical structures and subsequent plurality of structures are selectively recognized between static and moving objects based on intelligent object recognition;
installing a computer implemented drawing of the campus on the central server, the computer implemented drawing having a corresponding database of floorplans and site plans associated with the campus;

installing a unique second identifier into one of the plurality of physical structures, the unique second identifier having campus information and configured to be wirelessly sensed by the device and provide the device with the campus information;

determining a floor level and building designation via detection of the second unique identifier by the device; and receiving raw data, site plans, first identifier, and campus information to determine a first location of the device within the campus;

wherein the central server is further configured to i) receive additional raw data from the device, the additional raw data related to subsequent plurality of distances from the subsequent plurality of structures in relation to the first distance within the campus; and ii) correlate the additional raw data to the first location to determine subsequent locations of the device.

11. The method of claim 10, further comprising:
providing one or more cameras in communication with the central server and configured to stream images of the first location to a display;
wherein the one or more cameras provide intelligent object and facial recognition.

12. The method of claim 10, further comprising:
providing a computing device having a display;
wherein the computing device is in communication with the central server and provides a visual representation of the first location.

13. The method of claim 10, wherein the one or more sensors comprises one or more of:
an infrared sensor;
a radio frequency sensor; and
an ultrasound sensor.

14. The method of claim 10, wherein the device is a computing device.

15. The method of claim 10, wherein the device is a tag.

* * * * *